United States Patent [19]

Janay et al.

[11] Patent Number: 5,792,659
[45] Date of Patent: *Aug. 11, 1998

[54] TERMINAL EMULATOR ENHANCER WITH LOCAL CONFIGURABILITY

[76] Inventors: Gad Janay; Todd Yampel, both of 33 Maiden La., New York, N.Y. 10038

[*] Notice: The term of this patent shall not extend beyond the expiration date of Pat. No. 5,530,961.

[21] Appl. No.: 659,920

[22] Filed: Jun. 7, 1996

Related U.S. Application Data

[63] Continuation of Ser. No. 231,373, Apr. 21, 1994, Pat. No. 5,530,961.

[51] Int. Cl.$^6$ ........................................................ G06F 3/14
[52] U.S. Cl. ........................................................ 435/418
[58] Field of Search ........................ 395/118, 766–769; 435/418

[56] References Cited

U.S. PATENT DOCUMENTS

| | | | |
|---|---|---|---|
| 5,179,700 | 1/1993 | Aihara et al. | 345/326 |
| 5,235,654 | 8/1993 | Anderson et al. | 707/506 X |
| 5,241,651 | 8/1993 | Ueda | 395/61 |
| 5,361,393 | 11/1994 | Rossilo | 395/651 |
| 5,369,566 | 11/1994 | Pfost et al. | 364/147 |
| 5,410,675 | 4/1995 | Shreve et al. | 395/500 |
| 5,428,782 | 6/1995 | White | 395/671 |
| 5,442,771 | 8/1995 | Filepp et al. | 707/501 X |
| 5,444,841 | 8/1995 | Glaser et al. | 707/506 |
| 5,450,538 | 9/1995 | Glaser et al. | 707/508 |
| 5,485,370 | 1/1996 | Moss et al. | 364/408 |

OTHER PUBLICATIONS

Simpson, Mastering WordPerfect 5.31 & 5.2 for Windows, Sybex, 1992 1993 pp. 864–865, 1993.
IBM Personal Communications/3270 Version 3.1 Installation and Users Fuide, 1993.
Van den Hoven, End User Access Tools, Database Programming & Design, v.6, n. 8, pp. 42–49, Aug. 1993.
Watterson, 12 Hardworking Report Writers, Windows Sources, v. 1, n. 6, pp. 261–278, Jul. 1993.
Goddard, Back–End Independent Applications with SQL Windows, Data Based Advisor, v. 11, n. 3, pp. 76–82, Mar. 1993.
Rowan, Visual Programming, Paticia Seybold's Office Computing Report, v. 15, n. 11, pp. 3–18, Nov. 1992.
IBM Personal Communications/3270 Version 3.1 Installation and Users Guide for Full–Function DOS made.

*Primary Examiner*—Anton Fetting
*Attorney, Agent, or Firm*—Jeffrey I. Kaplan

[57] ABSTRACT

A computer terminal is disclosed which allows enhanced local configurability by permitting the user of the terminal to display information received from a remote host in a variety of ways which may be customized by the user without any programming efforts. Specifically, the terminal recognizes each screen of information downloaded from the remote host, and processes that screen in a manner easily definable by the user. This includes translation of literals to other languages, as well as "look and feel" attributes, such as color, etc.

5 Claims, 5 Drawing Sheets

TERMINAL EMULATOR ENHANCER WITH LOCAL CONFIGURABILITY

This application is a continuation of application Ser. No. 08/231,373, filed Apr. 21, 1994, now U.S. Pat. No. 5,530,961.

TECHNICAL FIELD

This invention relates to computers, and more specifically, to an improved user terminal which provides for customization by the user.

BACKGROUND OF THE INVENTION

Large mainframe computers have been in wide use for decades. These computers often include a communications system so that multiple users can access and operate the computer simultaneously.

A typical arrangement includes a single mainframe computer located in a computer room. Dozens, if not hundreds, of users are each provided with a computer terminal on their desktops in their own offices. The mainframe computer simultaneously services plural users, each of which is provided with his/her own terminal. These mainframe computers usually are equipped with a multi-tasking operating system such as CICS (an IBM system), UNIX (an AT&T product), or other such operating system.

In recent years, during which the price of personal computers (PC) has drastically been reduced, it has become common practice to replace the user terminals with a PC. The PC includes numerous layers of software which work together so that the personal computer appears to the mainframe like a terminal. The PC however, has capabilities far beyond that of a standard "dumb" terminal.

An exemplary terminal emulation arrangement is described in the publication "IBM Personal communications/3270 Version 3.1—Installation and User's Guide for Full-Function DOS mode". As described at chapter 5 of this publication, the end user of this system may configure certain parameters as desired.

The IBM arrangement contains several drawbacks. First, as noted in the publication, parameters such as screen color, curser style, etc. are in effect "globally". Once the user sets the screen color, for example, it will remain the same for every screen downloaded from the host and displayed on the display. Additionally, the system is not very flexible as the options are limited and are also the same for each user.

The causes of the above drawbacks are best understood by examining the structure of such a system. The personal computer is equipped with several layers of software and hardware, as indicated conceptually in FIG. 1. It is understood that PC 100 may include various other hardware and software components which are not shown in FIG. 1, but which are conventional in the art. Such other components are not critical to the present invention.

Figure 1:
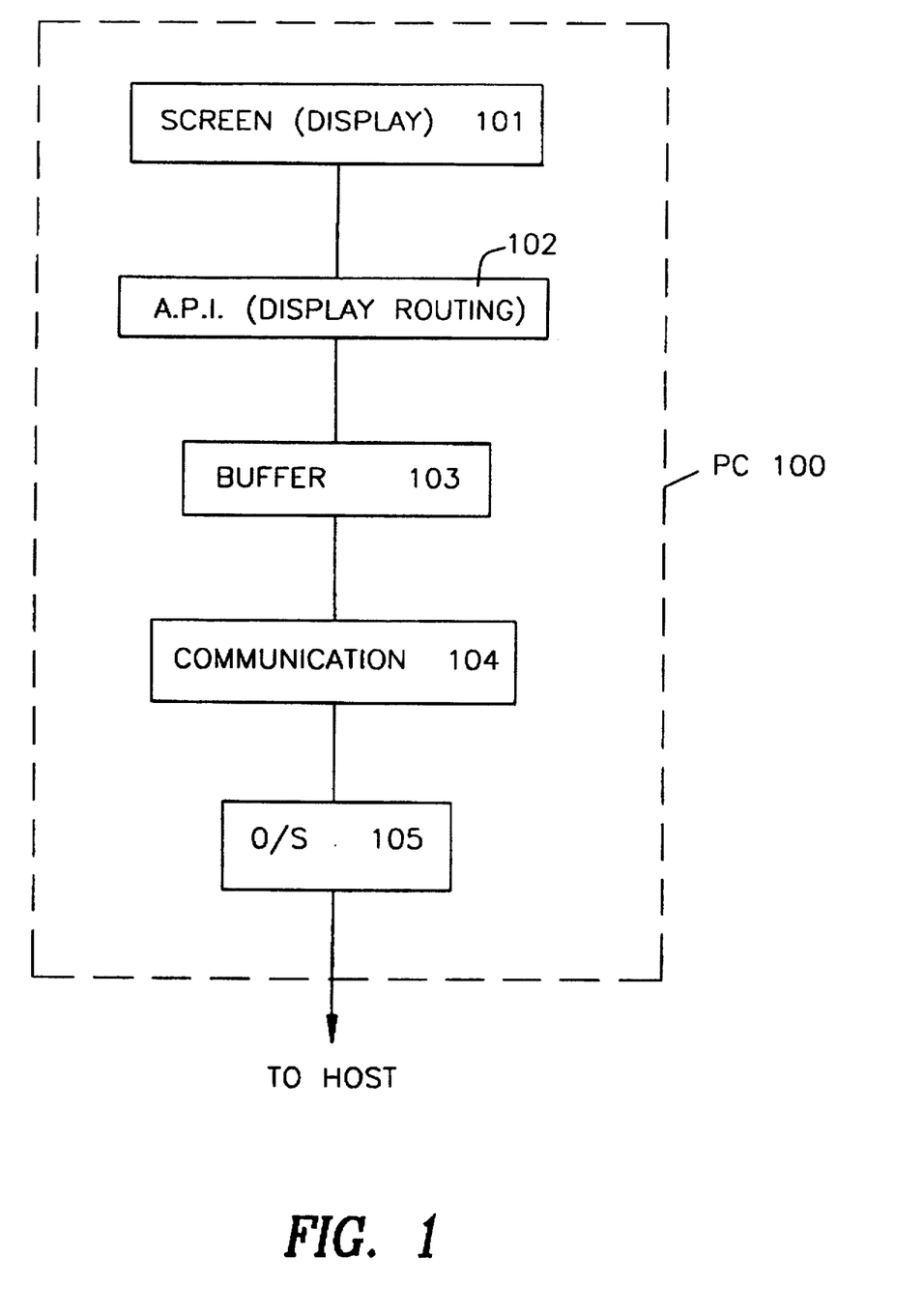
FIG. 1 shows a conceptual diagram of a portion of the software contained within an exemplary personal computer.

The PC 100 runs under its own operating system 105, examples of which are Disk Operating System (DOS), Windows, etc. Communication software 104 serves to implement a predefined communications protocol between PC 100 and a remote host, such that PC 100 appears to the host like a terminal designed specifically to interface with the host.

In operation, a screen of information arrives via communications software 104 and is placed into a buffer 103 for display on the user's screen. In many applications, such as those related to the financial industry, the screen of information usually includes numerous fields, one or more of which may require or allow the user to input data. The fields are displayed on the screen in an order and layout that makes user input of data convenient.

Applications programming interface 102 is a set of programming tools which allows the programmer, among other things, to write applications for retrieving information from buffer 103 and formatting that information before displaying it on screen 101. For example, the programmer may use API 102 to write application programs such that the screen color is different from what it would be if the information was simply displayed from buffer 103 directly onto screen 101. These applications will be termed "display routines" for purposes of explanation hereafter.

Importantly, the APIs may be used so that the alteration performed upon the screen information in buffer 103 is different depending upon the particular screen received and being displayed. Specifically, the screen of information stored in buffer 103 usually contains a screen identification (ID) code comprising several bytes of information in a predetermined location. The screen ID is generated by the application at the remote host, and serves to assist the display routine in identifying which particular screen has been received for display.

For example, consider two possible screen IDs, 123 and 890. Suppose that the screen of information associated with the 123 screen is intended to be read by the display routine from buffer 103, altered in a first manner, and displayed on display 101. Suppose further that the screen of information associated with screen ID 890 is intended to be read from buffer 103 by the display routine and altered in a second and different manner prior to display on display 101.

In order to ensure that the display routine can determine which screen is in fact stored in buffer 103, the screen ID is utilized. The display routine reads the screen ID from buffer 103 and based thereon, determines which screen is stored in buffer 103. After determining which screen is stored in buffer 103, the display routine is programmed to display the information in that screen (e.g.; fields and other data) in a predetermined manner based on several parameters associated with the Screen ID. Of course, in actuality, there would typically be many different screen IDs consisting of numerous alpha numeric combinations.

There are several problems associated with the above described prior art systems. One problem is that every screen downloaded by the host computer into buffer 103 must in fact contain a screen ID in the predetermined field in order to be recognized by the display routine. If no screen ID is present, the display routine does not know how the screen of information should be displayed.

Another major problem with the above arrangement is that if the application is changed, no display or a meaningless display may result. Specifically, suppose that the application running on the remote host were changed so that several fields were removed and/or other fields were added. Suppose further that the screen ID associated with the screen was not modified.

The display routine would simply recognize the screen ID and attempt to display the screen of information in a manner prescribed for a screen with that particular ID. However, the display routine will be looking for fields which are not present in buffer 103 (if these fields have been deleted), or alternatively, will not display fields which are contained within buffer 103 (if fields have been added at the remote application). Other problems may arise if the location of fields on the screen being received from the remote host has changed. In any case, the user may see a screen with missing information, or with information which is irrelevant such as random characters which the display routine believes is meaningful information.

Another severe drawback of the prior art arrangement described above is that solutions are not dynamic. Specifically, consider the case wherein a programmer writes a display routine using an API 102. If the remote application at the host is changed, the display routine must be rewritten to (i) recognize new fields and (ii) not display fields which are no longer present. Additionally, new programming at the host application may be required in order to provide a new screen ID number.

In view of the above, it can be appreciated that there a exists a need in the prior art for improvements which provide easy integration and display of numerous screens, flexibility to the user, and simple straightforward user customization.

SUMMARY OF THE INVENTION

The above and other problems of the prior art are overcome in accordance with the present invention which relates to a display routine which is based upon an algorithm which recognizes the screen by the layout and fields therein, not based solely upon the particular screen ID number. In accordance with the invention, an image recognition algorithm is utilized to recognize and display the information stored in buffer 103. The information is read from buffer 103 and processed by an algorithm which generates a unique ID number. If the ID number matches a predetermined list of stored ID numbers, the screen is recognized as a predetermined screen and is displayed in an appropriate manner. If not, the screen is assumed to be a new screen and is displayed in the exact manner in which it is stored in buffer 103. Accordingly, if the screen ID number remains the same but the application is altered such that fields are added, removed, etc., the screen will be recognized as a new screen (since a different screen ID will be generated) and the changes in the field will be nonetheless properly displayed.

Optionally, the user will then be permitted to define display parameters (e.g.; layout, color, context, sensitive help, etc.) for the new screen. The new screen ID and its associated display parameters will then be stored for use when the new screen is next utilized.

By generating the screen ID at the local terminal and by recognizing the screen based on its image rather than upon the ID transmitted by the remote host, the algorithm is adaptable, dynamic, and user configurable and contains numerous specific advantages as detailed below. Additionally, the algorithm allows the user of the data to modify the display.

In other enhanced embodiments to be described below, the user is permitted to specify a multiplicity of parameters to be associated with the unique screen ID generated by his personal computer for a particular screen. For example, the user may specify that when a particular screen is recognized and when the cursor is in a predetermined position on that recognized screen, that a particular help list should be displayed when the help key is pressed. Alternatively, the user can configure his local system so that particular fields are displayed, protected, masked, or such that function keys are remapped for each particular screen differently.

In summary, by having the local user terminal specifically recognize each screen based on its image (instead of just looking at the screen ID), the user is provided with greater flexibility in processing and display of that screen to said user.

DETAILED DESCRIPTION OF THE PREFERRED EMBODIMENT

Figure 2:
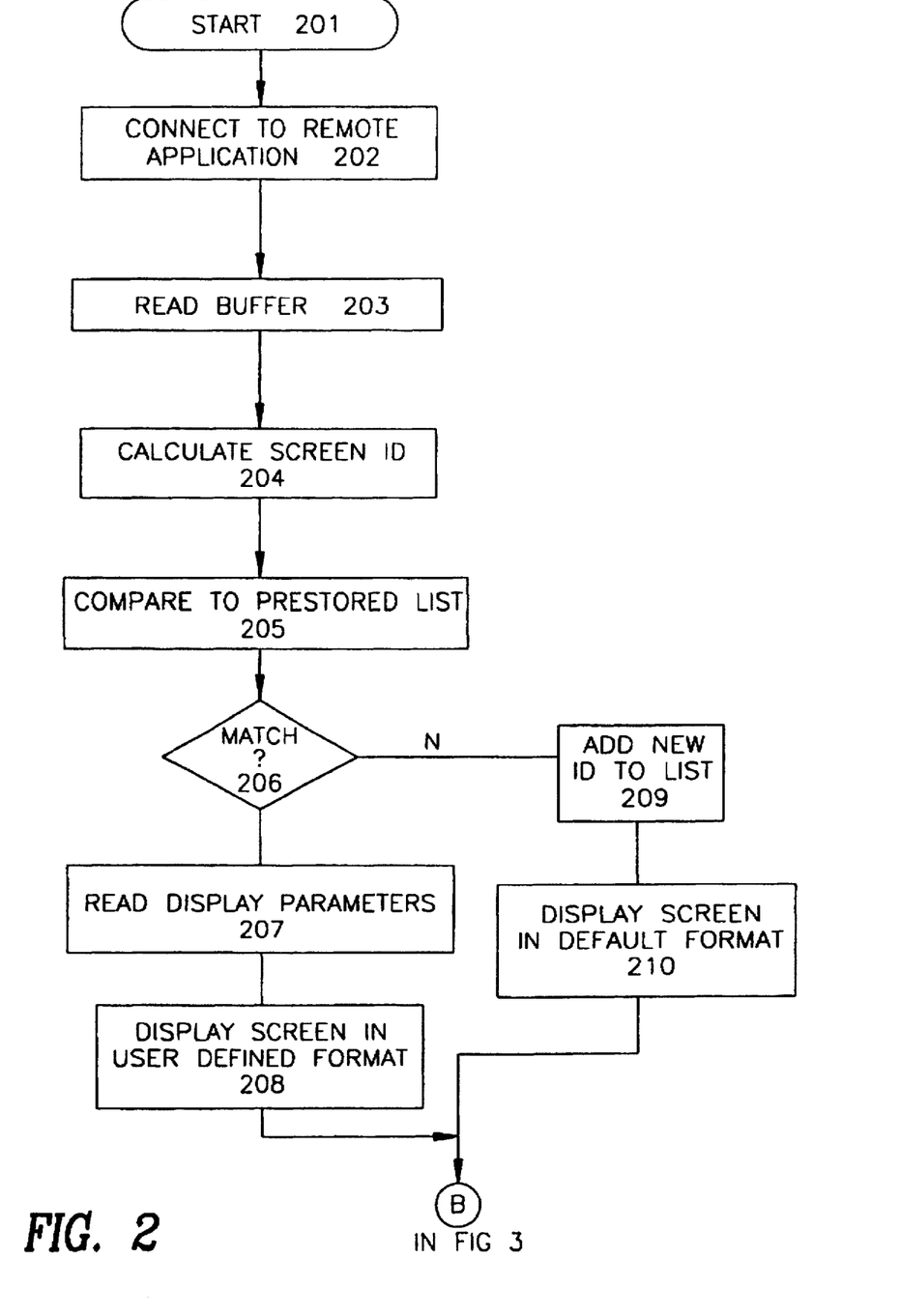
FIG. 2 is a flow chart of an algorithm which may be implemented by the display routine in order to generate user configurable and customized displays.

FIG. 2 shows a block diagram of a flow chart which can be implemented in any of a variety of programming languages in order to read information from a buffer and display it on a screen. In one preferred embodiment, the flow chart was implemented using the C++ language.

After the program enters start 201, a connection to a remote application is established at block 202. Next, control is transferred to operational block 203 labelled "read buffer". The screen information is read from buffer 103 and is used as an input to a screen recognition algorithm represented by operational block 204. Operational block 204 outputs a screen ID which uniquely identifies the particular screen by its layout, fields, etc., as will be described in more detail later. For immediate purposes however, the output of operational block 204 is an ID which uniquely identifies the screen stored in buffer 103. The screen ID is then compared to a list of pre-stored screen IDs, the IDs being stored in a file on the hard disk of the PC.

If the screen ID generated by operational block 203 matches an ID in the pre-stored list, then decision block 205 will use the screen ID to locate pre-stored information indicating various display parameters such as screen color, field protection for a particular field, masking, help, data field background and foreground colors, and other such parameters to be described later. These parameters are read from the PC's storage medium (e.g.; the hard disk) at operational block 207, and are used to display the screen in a user defined format at operational block 208.

At decision block 206, if the screen ID generated does not match any of those on the pre-stored list then a new screen ID is added to the list. The fact that the generated screen ID does not match any of the pre-stored screen IDs means that a new or modified screen has been received. In this case, since there will be no parameters indicating how the new screen should be displayed, the screen will simply be displayed in a default format (i.e.; "as is") by operational block 210. This format displays the screen exactly as it was downloaded from the host.

Figure 3:
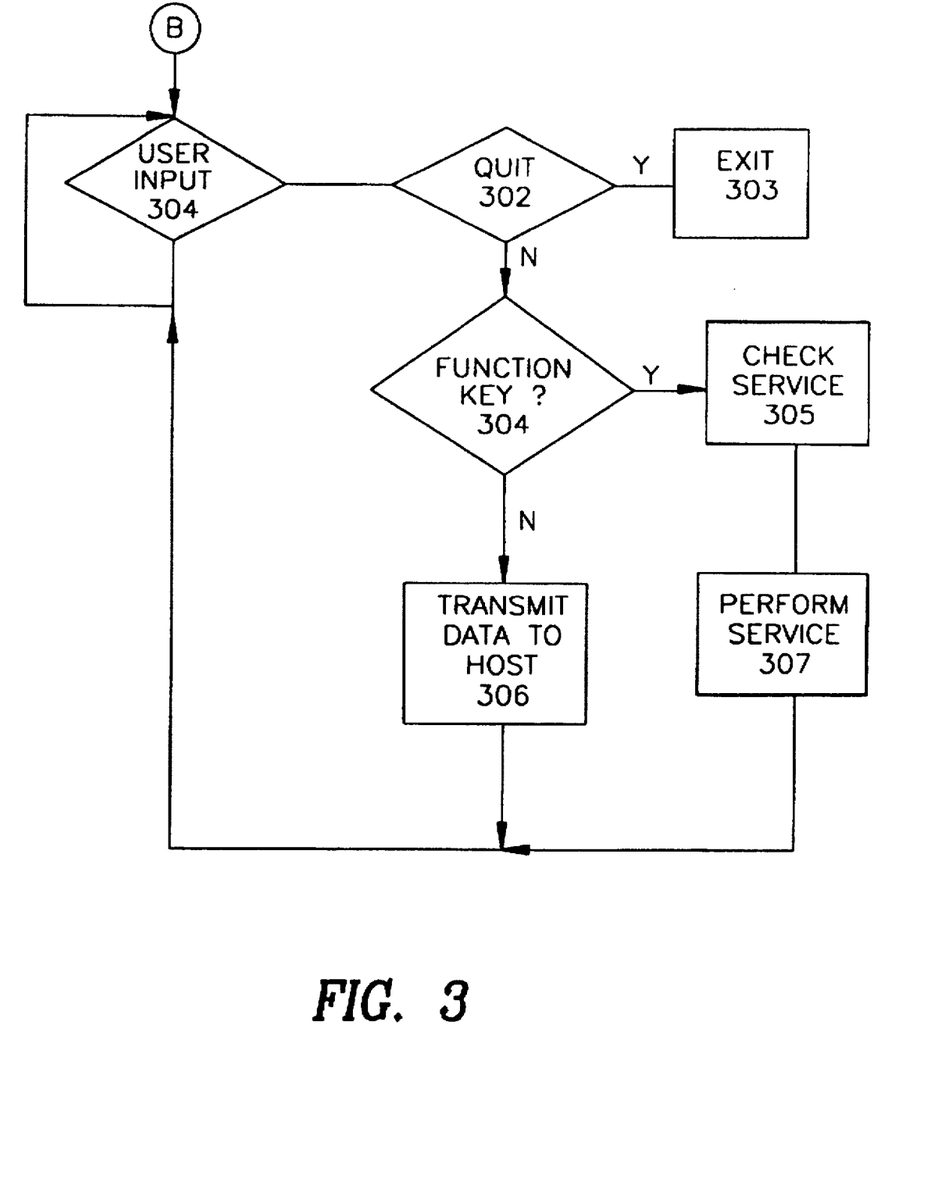
FIG. 3 shows an additional portion of the algorithm displayed in FIG. 2.

After the screen is displayed, either in default format or in a user defined format, the program enters decision block 301, shown in FIG. 3. Decision block 301 waits for user input. The input would typically be one of three types: data, function key (e.g.; PF key), or quit. If the user input is quit, then decision block 302 exits the program completely (block 303). If the user input is not a quit command but rather a function key command, then decisional block 304 transfers control to check service block 305. The check service block is a program which determines what information should be displayed upon the display and what service should be performed when the particular function key in question is depressed. Such programs are known and in widespread use among those of ordinary skill in the art.

Once it is determined which service should be performed or what should be displayed, control is transferred to operational block 307 which performs the required services and/or displays and sends control back to decision block 301 to wait for further user input.

If decision blocks 302 and 304 determine that the user input was neither quit nor a function key command, then the only other possibility is that the input was data entered into a field. In such a case, operational block 306 transmits the data to the remote host in a manner transparent to the user.

Importantly, when this data is transmitted to the host it may be re-formatted or altered so that it is in the form which the host, application is expecting. For example, consider an application which includes a field entitled "type of transaction". Assume that the remote host application is set up so that a 1 entered into this field means that the transaction was a sale whereas a 2 entered into this field means that the transaction was a lease. The user may configure his terminal so that he enters an S for sale and an L for lease. In such a case, operational block 306 would translate the S so that the remote host would receive a 1. Similarly, the L would be translated so that the remote host receives a 2. Another example would be if the terminal is configured to display information in a first language (e.g.; Spanish), and the host is operating in a second language (e.g.; English).

Thus, the particular configuration of the user terminal is substantially independent from the remote host application, and the translations which are required as data is transmitted between the terminal and host application are substantially user transparent.

The particular algorithm used to recognize the screen and generate the screen ID may vary from system to system, but a particular such algorithm will now be described. The screen recognition algorithm is based on a combination of information available to the program from the display buffer sent by the remote computer, plus information entered by the user. From the display buffer, the program derives the following information:

a) number of fields on the screen
b) type of each field
c) coordinates of the fields (row, column)
d) length of the field When a screen is received in the buffer, the above parameters are determined in order to generate a unique screen ID. If the ID generated matches one of those in the prestored list, then the screen is recognized and displayed in the manner previously described. If the screen ID generated using (a)–(d) does not match one of the prestored IDs, then a new screen is presumed to be in the buffer, and the program operates as previously described.

It is also noted that there exists the possibility that the parameters (a)–(d) above are not unique to a particular screen. In fact, it has been found that the parameters described above can only uniquely identify the screen approximately %70 of the time. In order to ensure uniqueness, the user may point out a particular field and select that field using a mouse, for example. The user may even select a part of a field that makes the field unique. Thereafter, not only does the screen recognition algorithm use parameters (a)–(d) to recognize the screen, but the algorithm can look for the particular field that the user believes makes the screen unique from all other screens. The user may even name the screen as desired.

Figure 4:
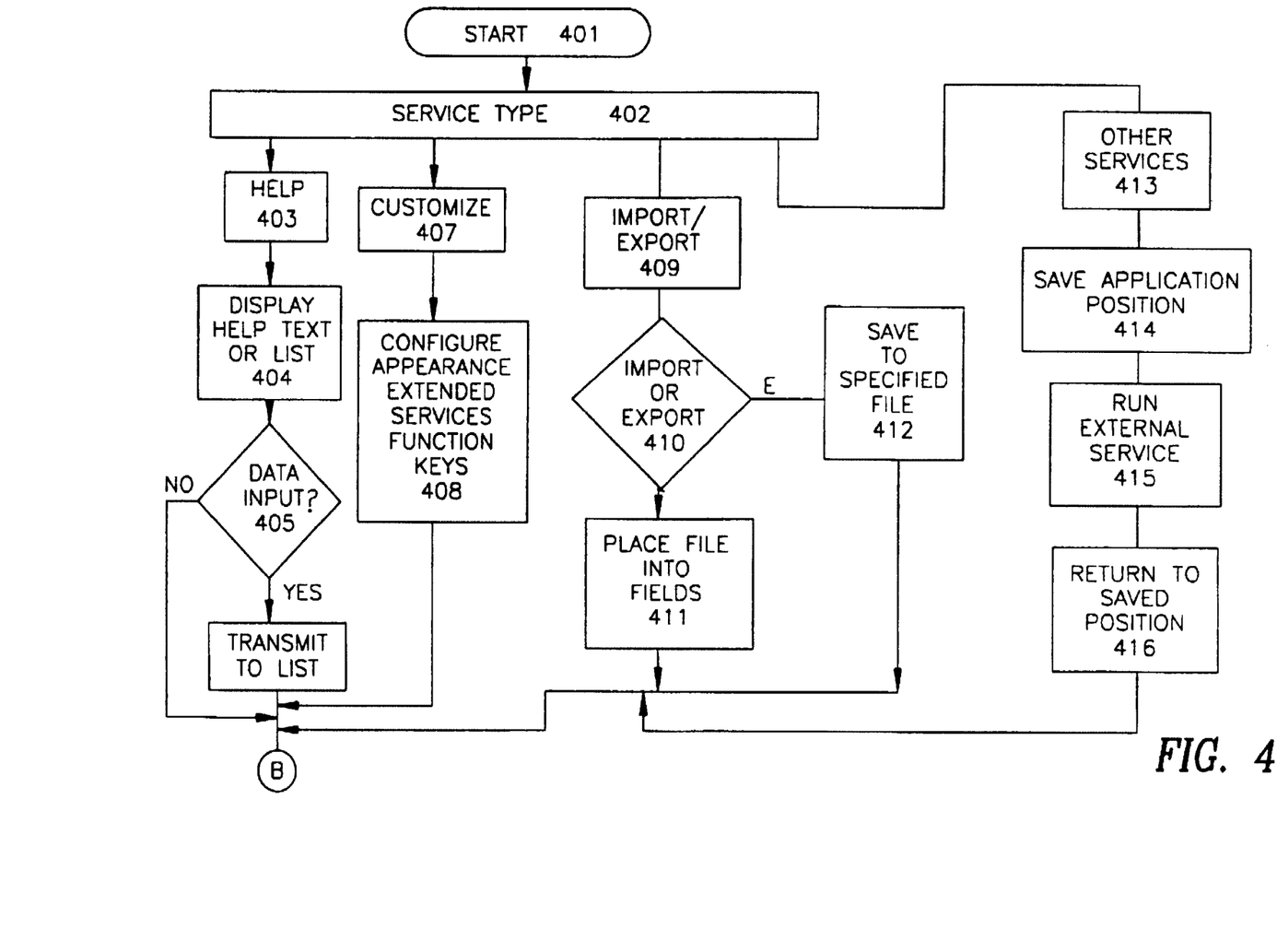
FIG. 4. is a block diagram depicting some additional capabilities of the present invention.

Concerning the services offered to the user at block 305, FIG. 4 shows a flow chart of four different types of services which may be offered. The flow chart of FIG. 4 is intended to be an implementation of blocks 305 and 307 of FIG. 3.

Start block 401 transfers control to service type selector 402. The service type selector 402 determines if the type of service selected is either help 403, customization services 407, import/export services 409, or some other type of service 413. Of course, it will be recognized by those of ordinary skill in the art that the operational block 413 may represent a multitude of different services and the particulars of each of these services are not critical to the invention.

Examining each of the four columns of FIG. 4 separately, we turn first to help block 403 which is entered if the user requests help by pushing a pre-determined key. Operational block 403 then transfers control to block 404 which reads the help text or list from a data base and displays the help text or list on the user's screen. Importantly, the help is context sensitive. Additionally, the help may be defined by the user to meet his specific needs.

For example, consider a field which the remote host application allows to be filled in with one of ten possible values. The user is given a menu driven utility which allows him to define the help key such that when the cursor is in the field in question and the help key pushed, a predetermined set of the options is displayed. Thus, if the user only uses five of the ten possibilities, he need not read through all ten. Moreover, each user can configure his help list to include any desired entries. Software developers will be knowledgeable as to how to write the software for generating menus to allow for user customization in a manner straightforward to the user.

Data input decision block 405 is then entered. If the user selects one of the numerous entries from the help list, operational block 406 will transmit the selection to the host. Additionally, if the help list entry selected may actually appear different from what is transmitted to the host however, any translation between formats is done in a manner transparent to the user. The program then returns to position B in FIG. 3.

There are several important aspects to the manner in which help is implemented. First, the list displayed when help is selected is dependent upon several factors. First, the list is dependent upon the present screen being displayed as well as the position of the cursor. Importantly, the help list or text displayed depends upon the user's own desires.

Figure 5A:
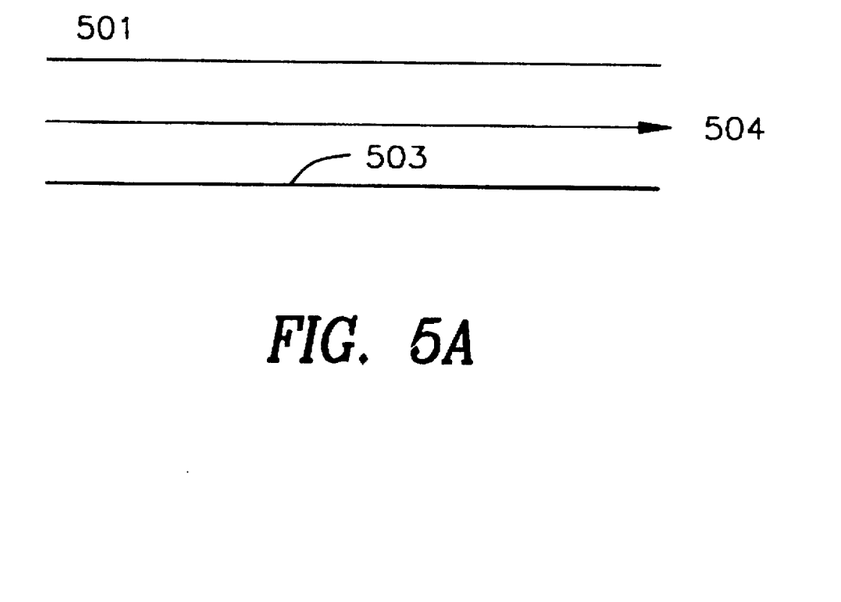
FIG. 5(a) and (b) depicts non-linear point and shoot capabilities, more fully described later herein.
Figure 5B:
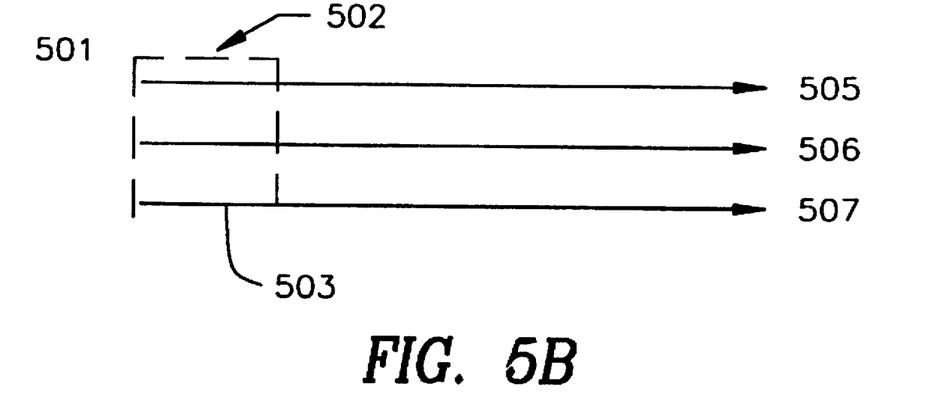

Additionally, help text may be selected and put into data fields in blocked format rather than linear format. Specifically, as shown in FIG. 5, previous text selection mechanisms allow text from point 501 to point 503 to be selected as input to a data field however, such prior methods required that the entire line 504 also be selected. In the present invention, the block indicated by 502 can be selected. Thus, the block may include multiple lines of text yet be shorter in width than any of the lines. When block 502 is outlined and a predetermined key is pressed, the blocked text may be entered directly into pre-defined fields in a database application.

Returning to FIG. 4, customization menu 407 provides a menu driven technique which allows the user to configure the appearance, any of the services, or the function keys associated with each screen and/or cursor position. The user enters customization menu by depressing a pre-determined key. The arrangement may then present numerous options to the user for rearranging the manner in which information will be displayed, the particular function keys for each desired service, etc.

For example, different remote application may utilize the function keys for different functions. This could be confusing to a user who must remember that different keys serve different purposes in different applications. Consider the situation wherein function key F5 services a particular purpose in application 1, but function key F7 serves the same purpose in application 2. The user may wish to remap function key F5 in the second application so that it serves the purpose of function key F7. In such a case, the user can use F5 for the function in both applications.

Additionally, certain display parameters may be protected by a password such that they cannot be modified by the user or even viewed. For example, if the user wishes to modify a field named "Bank account balance", the customization menu would have a layer of security software prohibiting such modification.

Import/export services 409 provide a technique for the user to retrieve data from an outside service or export data to an external service. At block 410 it is determined whether an import or export service is desired, and control is transferred to the appropriate one of operational blocks 411 and 412. Thereafter, the system returns to its "wait for user input" state. Finally, other services block 413 provides any one or more services which may be unrelated to the present invention. If the user desires to access one of these services, a predetermined key is pushed which prompts the system to save the current cursor position, screen, and other associated data and run the external service at block 415. After the external service is run, block 416 returns the system to the saved position, and continues to wait for user input.

In another embodiment, fields which are down loaded from the host with the same value each time may be remapped at the user's terminal. Specifically, consider an application wherein a sales agent in a corporation is presented with a particular screen. Assume that one of the fields on the screen is the sales agent location which always comes down from the host with the preassigned value "New York". The user terminal may be configured such that the value is always displayed as "Manhattan". In accordance with the inventive technique, the initial condition (i.e.; New York) is checked in order to ensure that the field is arriving with the value "New York" filled in. If the field arrives with the value "Long Island" filled in (indicating that the application program has been changed to reflect the fact that this sales agent has been moved to Long Island) then the terminal will display the field exactly as it arrives from the remote host, rather than remapping it to display the word "Manhattan". Thus, the terminal is arranged so that as long as the initial condition remains the same, the field will be displayed in a first form but if the initial condition changes, the field will be displayed however it arrives from the remote host.

Another optional enhancement allows predetermined fields to be saved to a database for later use. For example, when the screen information arrives at the terminal, the terminal may save specified field for specified screens into a database serving a predefined structure. By allowing the user to determine which of these fields are displayed from which screens, databases can be built on specified fields concerning each transaction which took place.

While the above describes the preferred embodiments of the invention, it will be apparent to those of ordinary skill of the art that numerous modifications and/or additions may be implemented. Such modifications and variations are intended to be covered by the following claims.

We claim:

1. A method of entering data into a database, said database to be stored on a remote computer, said remote computer being connected via a communications system to a local terminal, said method comprising the steps of:

transmitting, from said remote host, a screen of information, said screen of information including a one or more fields from a record of said database into which data is to be entered by a user, said screen further including at least one field generated by said host for the purpose of identifying said screen; and identifying, at said local terminal, said screen uniquely by (i) ascertaining information about said fields into which data is to be entered and (ii) processing at said local terminal said information ascertained about said fields into which data is to be entered to generate a unique screen ID, said unique screen ID being different from said at least one field generated by said host.

2. The method of claim 1 further comprising the step of generating help menus which vary depending upon said unique screen ID generated by said local terminal emulator.

3. The method of claim 1 further comprising the steps of:

ascertaining a position of a cursor on said local terminal; and displaying one of a plurality of help menus, the one help menu displayed being dependant upon (i) the unique screen ID generated and (ii) the position of the curser.

4. The method of claim 1 further comprising:

comparing said unique screen ID to a list of prestored IDs; and displaying fields from said record in a format determined by matching said unique screen ID with a prestored ID.

5. The method of claim 4 further comprising:

displaying fields from said record in a format which is the same as that in which said fields arrive from said remote host if none of said prestored IDs match said unique screen ID.

* * * * *

(12) REEXAMINATION CERTIFICATE (4812th)

United States Patent
Janay et al.

(10) Number: US 5,792,659 C1
(45) Certificate Issued: *Jul. 15, 2003

(54) TERMINAL EMULATOR ENHANCER WITH LOCAL CONFIGURABILITY

(75) Inventors: Gad Janay, New York, NY (US); Todres Yampel, New York, NY (US)

(73) Assignee: Advanced Transition Technologies, Inc., New York, NY (US)

Reexamination Request:
No. 90/006,119, Sep. 25, 2001

Reexamination Certificate for:
Patent No.: 5,792,659
Issued: Aug. 11, 1998
Appl. No.: 08/659,920
Filed: Jun. 7, 1996

(*) Notice: This patent is subject to a terminal disclaimer.

Related U.S. Application Data (63) Continuation of application No. 08/231,373, filed on Apr. 21, 1994, now Pat. No. 5,530,961.

(51) Int. Cl.⁷ .................................................. G06F 3/14
(52) U.S. Cl. ..................................................... 345/744
(58) Field of Search ................................. 345/700, 705, 345/744, 746, 747, 762, 764, 765, 780, 781, 803, 810, 856, 866; 707/1, 100, 102, 505–508; 709/201, 203, 217; 715/505–508

(56) References Cited

U.S. PATENT DOCUMENTS

| | | | | | |
|---|---|---|---|---|---|
| 5,179,700 A | * | 1/1993 | Aihara et al. | ............... | 345/744 |
| 5,235,654 A | * | 8/1993 | Anderson et al. | ........... | 101/485 |
| 5,241,651 A | * | 8/1993 | Ueda | ........................... | 700/29 |
| 5,361,393 A | * | 11/1994 | Rossillo | ...................... | 709/100 |
| 5,369,566 A | * | 11/1994 | Pfost et al. | .................... | 700/18 |
| 5,410,675 A | * | 4/1995 | Shreve et al. | ................. | 710/65 |
| 5,428,782 A | * | 6/1995 | White | ......................... | 709/101 |
| 5,442,771 A | * | 8/1995 | Filepp et al. | ............. | 707/501.1 |
| 5,444,841 A | * | 8/1995 | Glaser et al. | ............... | 707/506 |
| 5,450,538 A | * | 9/1995 | Glaser et al. | ............... | 707/508 |
| 5,485,370 A | * | 1/1996 | Moss et al. | .............. | 379/93.17 |

OTHER PUBLICATIONS

Simpson, Mastering WordPerfect 5.1 & 5.2 for Windows, Sybex, 1992, 1993, pp. 864–865.*
IBM Personal Communications/3270 Version 3.1 Installations and Users Guide for Full–Function DOS Mode, 1993.*
Van den Hoven, End User Access Tools, Database Programming & Design, vol. 6, No. 8, pp. 42–49, Aug. 1993.*
Watterson, 12 Hardworking Report Writers, Windows Sources, vol. 1, No. 6, pp. 261–278, Jul. 1993.*
Goddard, Back–End Independent Applications with SQL Windows, Data Based Advisor, vol. 11, No. 3, pp. 76–82, Mar. 1993.*
Rowan, Visual Programming, Patricia Seybold's Office Computing Report, vol. 15, No. 11, pp. 3–18, Nov. 1992.*
MacPROFF: User Guide Version 2.0 Published May 1st, 1991.
Flashpoint, The First Step to Cooperative Processing, Viewpoint Systems, Oct. 1991, p. 10.
Knowledgeware®, Flashpoint™ Tutorial, Version 3.04.

* cited by examiner

*Primary Examiner*—Crescelle N. dela Torre (57) ABSTRACT

A computer terminal is disclosed which allows enhanced local configurability by permitting the user of the terminal to display information received from a remote host in a variety of ways which may be customized by the user without any programming efforts. Specifically, the terminal recognizes each screen of information downloaded from the remote host, and processes that screen in a manner easily definable by the user. This includes translation of literals to other languages, as well as "look and feel" attributes, such as color, etc.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–4 are determined to be patentable as amended.

Claim 5, dependent on an amended claim, is determined to be patentable.

New claims 6–16 are added and determined to be patentable.

1. A method of entering data into a database, said database to be stored on a remote computer, said remote computer being connected via a communications system to a local terminal, said method comprising the steps of:
transmitting, from said remote host, a screen of information, said screen of information including [a] one or more fields from a record of said database into which data is to be entered by a user, said screen further including at least one field generated by said host for the purpose of identifying said screen; and
identifying, at said local terminal, said screen uniquely by (i) ascertaining information about said fields into which data is to be entered and (ii) processing at said local terminal said information ascertained about said fields into which data is to be entered to generate a unique screen ID, said unique screen ID being different from said at least one field generated by said host;
*wherein said step of processing comprises calculating said information by means of selected sequential operations.*

2. [The method of claim 1 further comprising the step of] *A method of entering data into a database, said database to be stored on a remote computer, said remote computer being connected via a communications system to a local terminal, said method comprising the steps of:*
*transmitting, from said remote host, a screen of information, said screen of information including one or more fields from a record of said database into which data is to be entered by a user, said screen further including at least one field generated by said host for the purpose of identifying said screen;*
*identifying, at said local terminal, said screen uniquely by (i) ascertaining information about said fields into which data is to be entered and (ii) processing at said local terminal said information ascertained about said fields into which data is to be entered to generate a unique screen ID, said unique screen ID being different from said at least one field generated by said host; and*
generating help menus which vary depending upon said unique screen ID generated by said local terminal emulator.

3. [The method of claim 1 further comprising the steps of:] *A method of entering data into a database, said database to be stored on a remote computer, said remote computer being connected via a communications system to a local terminal, said method comprising the steps of:*
*transmitting, from said remote host, a screen of information, said screen of information including one or more fields from a record of said database into which data is to be entered by a user, said screen further including at least one field generated by said host for the purpose of identifying said screen;*
*identifying, at said local terminal, said screen uniquely by (i) ascertaining information about said fields into which data is to be entered and (ii) processing at said local terminal said information ascertained about said fields into which data is to be entered to generate a unique screen ID, said unique screen ID being different from said at least one field generated by said host;*
ascertaining a position of a cursor on said local terminal; and
displaying one of a plurality of help menus, the one help menu displayed being dependant upon (i) the unique screen ID generated and (ii) the position of the [curser] *cursor*.

4. The method of claim [1] *2* further comprising:
comparing said unique screen ID to a list of prestored IDs; and
displaying fields from said record in a format determined by matching said unique screen ID with a prestored ID.

6. *The method of claim 3 further comprising:*
*comparing said unique screen ID to a list of prestored IDs; and*
*displaying fields from said record in a format determined by matching said unique screen ID with a prestored ID.*

7. *The method of claim 6 further comprising:*
*displaying fields from said record in a format which is the same as that in which said fields arrive from said remote host if none of said prestored IDs match said unique screen ID.*

8. *A method of entering data into a database, said database to be stored on a remote computer, said remote computer being connected via a communications system to a local terminal, said method comprising the steps of:*
*transmitting from the remote host a screen of information which includes one or more fields from a record of said database into which data is to be entered by a user, said screen further including at least one field generated by said host for the purpose of identifying said screen;*
*identifying, at said local terminal, said screen of information uniquely by (i) ascertaining information about said fields into which data is to be entered and (ii) processing at said local terminal said information ascertained about said fields into which data is to be entered to generate a unique screen ID, said unique screen ID being different from said at least one field generated by said host; and*
*wherein said fields about which said information is to be ascertained are automatically determined.*

9. *The method of claim 8, where a user may specify one or more additional fields or parts of fields of the screen of information about which information is to be ascertained.*

10. *The method of claim 8, where a user may modify or delete one or more fields of the screen of information about which information is to be ascertained.*

11. *The method of claim 9, where a user may modify or delete one or more fields of the screen of information about which information is to be ascertained.*

12. *A method of entering data into a database, said database to be stored on a remote computer, said remote* computer being connected via a communications system to a local terminal, said method comprising:

> transmitting from the remote host a screen of information which includes one or more fields from a record of said databasae into which data is to be entered by a user, said screen further including at least one field generated by said host for the purpose of identifying said screen; and
>
> uniquely identifying, at said local terminal, said screen of information by (i) ascertaining information about said fields into which data is to be entered and (ii) operating upon said fields with an image recognition algorithm to generate a unique screen ID, said unique screen ID being different from at least one field generated by said host.

13. The method of claim 12, where inputs and processing steps of the image recognition algorithm are set by the system.

14. The method of claim 13, where a user may specify additional inputs to the image recognition algorithm.

15. The method of claim 13, where a user may specify additional processing steps to the image recognition algorithm.

16. The method of claim 13, where a user may modify or delete pre-set inputs or processing steps of the image recognition algorithm.

* * * * *